(12) United States Patent
Asahi

(10) Patent No.: US 10,170,997 B2
(45) Date of Patent: Jan. 1, 2019

(54) SWITCHING POWER SUPPLY APPARATUS

(71) Applicant: DENSO CORPORATION, Kariya, Aichi-pref. (JP)

(72) Inventor: Takashi Asahi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/782,994

(22) Filed: Oct. 13, 2017

(65) Prior Publication Data

US 2018/0262113 A1  Sep. 13, 2018

(30) Foreign Application Priority Data

Mar. 13, 2017 (JP) .................................. 2017-47226

(51) Int. Cl.
| | |
|---|---|
| *H02M 3/158* | (2006.01) |
| *G05F 1/46* | (2006.01) |
| *H02M 1/00* | (2006.01) |
| *H02M 3/156* | (2006.01) |

(52) U.S. Cl.
CPC ............ *H02M 3/1588* (2013.01); *G05F 1/46* (2013.01); *H02M 3/156* (2013.01); *H02M 2001/0032* (2013.01)

(58) Field of Classification Search
CPC ......... H02M 3/156; H02M 3/157; H02M 1/38
USPC ................................................ 323/282–285
See application file for complete search history.

(56) References Cited

U.S. PATENT DOCUMENTS

| | | | |
|---|---|---|---|
| 5,481,178 A | 1/1996 | Wilcox et al. | |
| 5,731,694 A | 3/1998 | Wilcox et al. | |
| 5,994,885 A | 11/1999 | Wilcox et al. | |
| 6,288,524 B1* | 9/2001 | Tsujimoto ............. | H02M 3/156 323/282 |
| 6,304,066 B1 | 10/2001 | Wilcox et al. | |
| 2002/0017897 A1 | 2/2002 | Wilcox et al. | |
| 2004/0257057 A1* | 12/2004 | Nakata .................. | H02M 3/156 323/284 |
| 2007/0090821 A1* | 4/2007 | Imai ....................... | H02M 1/32 323/284 |
| 2008/0315851 A1* | 12/2008 | Akiyama ............ | H02M 3/1588 323/284 |
| 2011/0175588 A1* | 7/2011 | Miyamae ............ | H02M 3/1582 323/283 |
| 2012/0025797 A1* | 2/2012 | Futamura .............. | H02M 3/156 323/283 |

(Continued)

*Primary Examiner* — Alex Torres-Rivera
(74) *Attorney, Agent, or Firm* — Posz Law Group, PLC

(57) ABSTRACT

A PWM signal generation circuit controls a current mode to set a PWM signal to an on-level in synchronization with a dock signal and set the PWM signal to an off-level in synchronization with a normal reset signal, which changes its level when a current detection signal reaches an error signal. A switching determination circuit checks whether an output voltage reached a switching determination voltage higher than a target output voltage. A reset signal generation circuit generates a reset signal, which is delayed by a predetermine time period from a time point of a change of the PWM signal to the on-level. When the switching determination circuit determines that the output voltage reached the switching determination voltage, the PWM signal generation circuit changes the PWM signal to the off-level in synchronization with the reset signal in place of the reset signal.

12 Claims, 13 Drawing Sheets

(56) References Cited

U.S. PATENT DOCUMENTS

| | | | |
|---|---|---|---|
| 2013/0300397 A1* | 11/2013 | Kinjo | H02M 3/24 323/358 |
| 2015/0229212 A1* | 8/2015 | Shiwaya | H02M 3/158 323/282 |
| 2016/0172978 A1* | 6/2016 | Fukumoto | H02M 3/156 713/300 |
| 2016/0181942 A1* | 6/2016 | Sugawara | H02M 3/156 363/126 |
| 2016/0380539 A1* | 12/2016 | Fukumoto | H02M 3/158 323/271 |

* cited by examiner

SWITCHING POWER SUPPLY APPARATUS

CROSS REFERENCE TO RELATED APPLICATION

The present application is based on Japanese patent application No. 2017-047226 filed on Mar. 13, 2017, the whole contents of which are incorporated herein by reference.

FIELD

The present disclosure relates to a switching power supply apparatus of a current mode control type.

BACKGROUND

In a switching power supply apparatus of a current mode control type, a pulse width of a pulse-width-modulation (PWM) signal for attaining a desired output voltage is determined as (Vout/Vin)×Tsw, in which Vout, Vin and Tsw are assumed to be an output voltage, an input voltage and a switching period Tsw, respectively. In this case, the switching power supply apparatus is a voltage step-down type and the pulse width is a pulse width of an ON pulse, which turns on a switching element provided at a high-potential side.

A minimum pulse width cannot be decreased infinitely and is limited because of delay time periods of a pre-driver circuit, a driver circuit, a noise-masking processing circuit and a current detection circuit. In case that the minimum pulse width is longer than a pulse width required to provide a desired output voltage, the desired output voltage cannot be provided and the output voltage rises above the desired voltage value.

To counter this problem, it is proposed to thin out the PWM pulse for suppressing a rise of the output voltage by decreasing a frequency of the PWM pulse, when the output voltage rises to be higher than a predetermined voltage value (for example, JP H06-303766, US 2002-0017897A1).

According to the proposal described above, a switching frequency varies because there arises a time period of thinning out, that is, no generation of the PWM signal. As a result, a frequency band of radio noise generation varies and EMC property changes.

SUMMARY

The present disclosure addresses the problem described above and has an object to provide a switching power supply apparatus, which suppresses variation in an output voltage without changing a switching frequency.

According to the present disclosure, a switching power supply apparatus comprises a main circuit, a current detection circuit, a voltage detection circuit, an error amplification circuit, a PWM signal generation circuit, a driver circuit, a switching determination circuit and a reset signal generation circuit. The main circuit includes a switching element and an inductor. The switching element turns on to increase a current flowing in the inductor when a driving signal changes to an on-level and turns off to recirculate the current flowing in the inductor to an output side when the driving signal changes to an off-level. The current detection circuit outputs a current detection signal corresponding to the current flowing in the inductor through the switching element. The voltage detection circuit outputs a detection voltage corresponding to the output voltage of the main circuit. The error amplification circuit for outputs an error signal in accordance with a difference between a reference voltage corresponding to a target output voltage of the main circuit and the detection voltage. The PWM signal generation circuit for performing a current mode control to set the PWM signal to the on-level in synchronization with a dock signal and set the PWM signal to the off-level in synchronization with a normal reset signal, which changes a level when the current detection signal reaches the error signal. The driver circuit outputs the driving signal in response to the PWM signal. The switching determination circuit checks whether the output voltage reached the a switching determination voltage higher than the target output voltage. The reset signal generation circuit generates a reset signal for a short-pulse operation, which is delayed by a predetermined delay period from a time point of a change of the PWM signal to the on-level. The PWM signal generation circuit changes the PWM signal to the off-level in synchronization with the reset signal for short-pulse operation in place of the normal reset signal when the switching determination circuit determines that the output voltage reached the switching determination voltage.

DETAILED DESCRIPTION OF THE EMBODIMENTS

Figure 1:
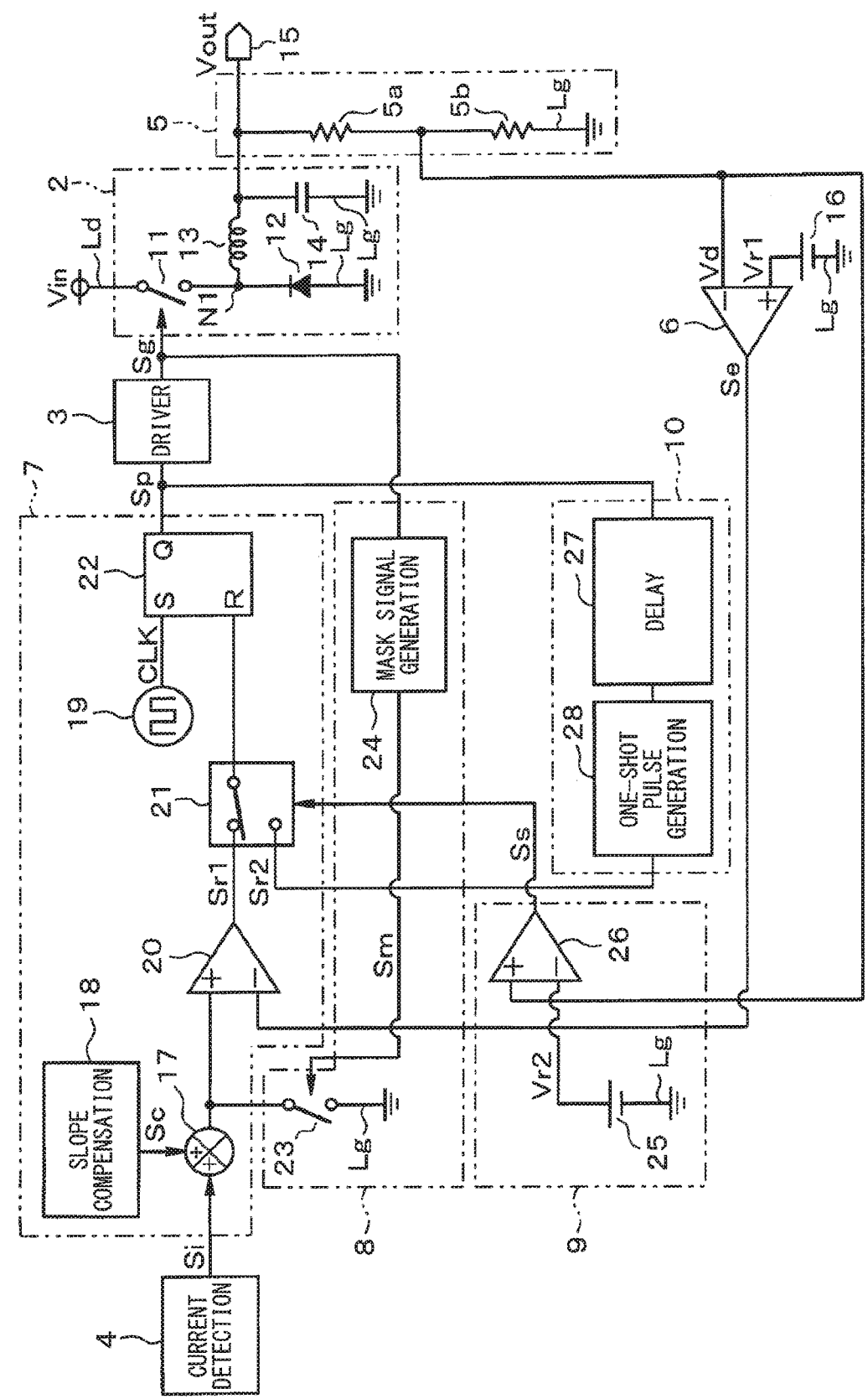
FIG. 1 is a schematic circuit diagram showing a configuration of a switching power supply apparatus according to a first embodiment.

A switching power supply apparatus will be described below with reference to multiple embodiments shown in the drawings, in which substantially same circuit structural parts are designated with same reference numerals for simplification of description.

First Embodiment

Referring to FIG. 1, a switching power supply apparatus 1 is a voltage step-down type regulator, which receives an input voltage Vin supplied from an in-vehicle battery and generates a stabilized output voltage Vout to in-vehicle devices (not shown) by performing a current control mode of a peak current detection type.

The switching power supply apparatus 1 includes a main circuit 2, a driver circuit 3, a current detection circuit 4, a voltage detection circuit 5, an error amplifier 6, a PWM signal generation circuit 7, a mask processing circuit 8, a switching determination circuit 9, a reset signal generation circuit 10 and the like. The main circuit 2 includes a switching element 11, a diode 12, an inductor 13 and a capacitor 14.

The switching element 11 is formed of, for example, a MOSFET and illustrated in a simple switch form in FIG. 1. One of main terminals of the switching element 11 is connected to a power line Ld, which supplies the input voltage Vin. The other of the main terminals of the switching element 11 is connected to a node N1. The switching element 11 turns on, when a driving signal Sg having an on-level, which exceeds a threshold voltage Vth, is applied from the driver circuit 3 to a gate of the MOSFET.

A cathode of the diode 12 is connected to the node N1. An anode of the diode 12 is connected to a ground line Lg, which provides a circuit reference voltage. The inductor 13 is connected between the node N1 and an output terminal 15, which outputs the output voltage Vout. The capacitor 14 is a smoothing capacitor connected between the output terminal 15 and the ground line Lg.

The driver circuit 3 outputs the driving signal Sg of the on-level, when the PWM signal Sp is at a high level (referred to as H-level below) corresponding to the on-level. The driver circuit 3 outputs the driving signal Sg of an off-level, when the PWM signal Sp is at a low level (referred to as L-level below) corresponding to the off-level. The driver circuit 3 has its delay between its input and output terminals.

When the switching element 11 turns on, a current, which flows from the line Ld to the inductor 13 through the switching element 11, increases. When the switching element 11 turns off, the current flowing through the inductor 13 recirculates to the output side through the diode 12.

The current detection circuit 4 is in a high-side current detection configuration. That is, although not illustrated, the current detection circuit 4 includes a shunt resistor connected in series with the switching element 11 and an amplifier circuit for outputting a current detection signal Si by amplification of a voltage of the shunt resistor. The current detection signal Si corresponds to a signal, which flows to the inductor 13 when the switching element 11 is in an on-state.

Alternatively to such a current detection method using a shunt resistor, the current may be detected by using an on-resistance of the switching element 11. That is, the current flowing in the inductor 13 may be detected based on a voltage developed between a drain and a source of the switching element 11. Further alternatively, the current may be detected by connecting a sensing element in parallel to the switching element 11. That is, the current flowing in the inductor 13 may be detected based on a terminal voltage or a current of the sensing element.

The voltage detection circuit 5 is formed of a voltage divider circuit of resistors 5a and 5b to output a detection voltage Vd, which corresponds to the output voltage Vout. A reference voltage generation circuit 16 outputs a reference voltage Vr1, which corresponds to a target voltage of the output voltage Vout. The error amplifier 6 outputs an error signal Se, which is a voltage signal corresponding to a difference between the detection voltage Vd and the reference voltage Vr1. Although not illustrated, the error amplifier 6 further has a C-R circuit, for example, connected between its input-output terminals or between its output terminal and the ground line Lg. The error amplifier 6 is an error amplification circuit.

The PWM signal generation circuit 7 operates in a current control mode, by which the PWM signal Sp is set to the H-level in synchronization with a clock signal CLK and, when a current detection signal Si reaches an error signal Se, the PWM signal Sp is set to the L-level. For preventing sub-harmonic oscillation, an adder adds a slope compensation signal Sc such as a saw-tooth wave signal generated by a slope compensation circuit 18 to the current detection signal Si outputted from the current detection circuit 4.

Alternatively to a slope compensation method of adding the slope compensation signal Sc to the current detection signal Si side described above, the slope compensation signal Sc may be subtracted from the error signal Se side outputted from the error amplifier 6.

The clock generation circuit 19 outputs a clock signal CLK having a PWM period of the switching power supply apparatus 1, that is, a frequency corresponding to a switching frequency of the switching power supply apparatus 1. A comparator 20 compares the current detection signal Si applied to a non-inverting input terminal and the error signal Se applied to an inverting input terminal and outputs a reset signal Sr1. As described later, the reset signal Sr1 is a normal reset signal, which is for a normal operation of the switching power supply apparatus 1.

The reset signal Sr1 is applied to one of the input terminals of a switching circuit 21. A reset signal Sr2 outputted from the reset signal generation circuit 10 is applied to the other of the input terminals of the switching circuit 21. As described later, the reset signal Sr2 is for a short-pulse operation of the switching power supply apparatus 1. The switching circuit 21 selects either one of the reset signals Sr1 and Sr2 based on a selection signal outputted from the switching determination circuit 9 and outputs a selected reset signal. A set-reset (SR) latch 22 receives the clock signal CLK at its set terminal S. The SR latch 22 receives the output signal of the switching circuit 21 at its reset terminal R. The SR latch 22 outputs the PWM signal Sp from an output terminal Q.

The mask processing circuit 8, which subjects the current detection signal Si to mask processing, includes a switch circuit 23 and a mask signal generation circuit 24. The switch circuit 23 is provided between an output terminal of an adder 17, that is, between the non-inverting input terminal of the comparator 20 and the ground line Lg. The mask signal generation circuit 24 generates a mask signal, which controls an on-off state of the switch circuit 23.

The switch circuit 23 is formed of a switching element such as FET. The switch circuit 23 turns on and off when a mask signal Sm is at an H-level and an L-level, respectively. The mask signal generation circuit 24 includes a delay circuit for generating the mask signal Sm based on the driving signal Sg. The mask signal generation circuit 24 generates the mask signal, which is maintained at the H-level for a fixed period from a time point of a change of the driving signal Sg to the H-level, and outputs the mask signal Sm to the switch circuit 23.

The switching determination circuit 9 includes a reference voltage generation circuit 25 and a comparator 26 for checking whether the output voltage Vout reached a switching reference voltage. The switching reference voltage is for checking a rise of the output voltage Vout and set to a predetermined voltage higher than a target voltage value of the output voltage Vout (target output voltage).

The reference voltage generation circuit 25 outputs the reference voltage Vr2, which corresponds to the switching reference voltage. Since the reference voltage Vr2 generated by the reference voltage generation circuit 25 corresponds to the switching reference voltage, it is higher than the reference voltage Vr1 generated by the reference voltage generation circuit 16.

The comparator 26 compares the detection voltage Vd applied to a non-inverting input terminal with the reference voltage Vr2 applied to the inverting input terminal and outputs a selection signal Ss. In this configuration, the detection voltage Vd corresponds to the output voltage Vout and the reference voltage Vr2 corresponds to the switching determination signal.

The reset signal generation circuit 10 generates the reset signal Sr2, which is delayed by a predetermined delay period from the time point of the change of the PWM signal Sp to the on-level. The reset signal Sr2 is a reset signal for a short-pulse operation. The reset signal generation circuit 10 includes a delay circuit 27 and a one-shot pulse generation circuit 28.

The delay circuit 27 receives the PWM signal Sp, which is the output signal of the SR latch 22, and outputs a delay signal, which is delayed by a predetermined delay period from the PWM signal Sp. The delay period of the delay circuit 27 may be set to an arbitrary value in accordance with specifications of the switching power supply apparatus 1. The one-shot pulse generation circuit 28 outputs the reset signal Sr2 as a pulse signal, which changes to H-level for only a predetermined period from a rise of the delay signal applied from the delay circuit 27.

In the configuration described above, the PWM signal generation circuit 7 operates in the current control mode. In this control mode, the PWM signal generation circuit 7 sets the PWM signal Sp to the H-level in synchronization with the clock signal CLK during a period, in which the switching determination circuit 9 outputs the selection signal Ss of the H-level, that is, the output voltage Vout is lower than the switching determination voltage. The PWM signal generation circuit 7 further sets the PWM signal Sp to the L-level in synchronization with the normal reset signal Sr1, the level of which changes when the mask-processed current detection signal SI reaches the error signal Se. In the following description, the operation mode of the PWM signal generation circuit 7 described above is referred to as a normal operation mode.

The PWM signal generation circuit 7 further operates in the current control mode. In this control, the PWM signal generation circuit 7 sets the PWM signal Sp to the H-level in synchronization with the dock signal CLK during a period, in which the switching determination circuit 9 outputs the selection signal Ss of the L-level, that is, the output voltage Vout is equal to or higher than the switching determination voltage. The PWM signal generation circuit 7 further sets the PWM signal Sp to the L-level in synchronization with the reset signal Sr2. In the following description, the operation mode of the PWM signal generation circuit 7 described above is referred to as a short-pulse operation mode.

An operation of the first embodiment will be described below.

[1] Operation Sequence of PWM Signal Generation Circuit 7

Figure 2:
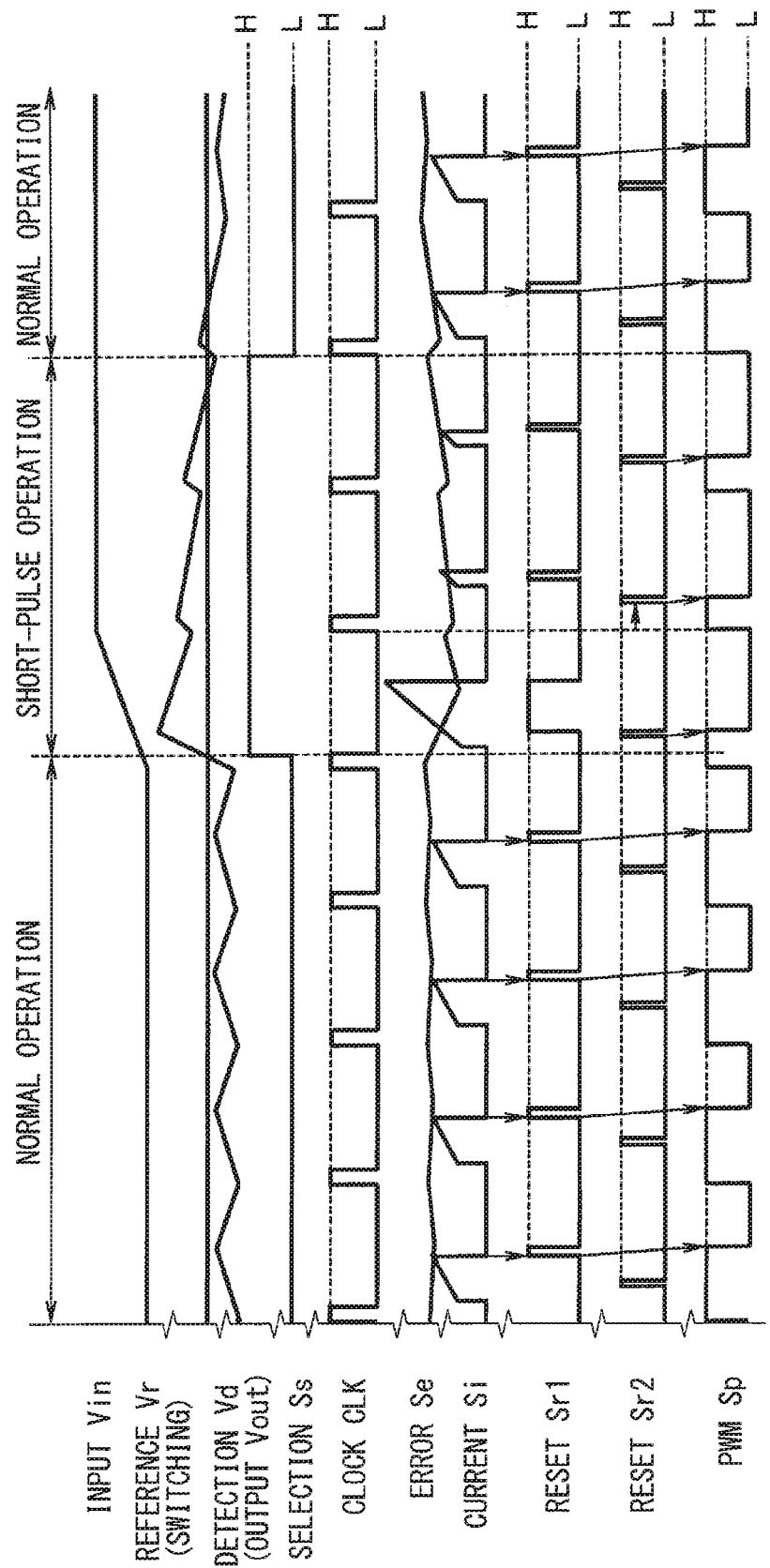
FIG. 2 is a time chart showing an operation sequence of a PWM signal generation circuit, that is, waveforms of signals and voltages of various circuits in the first embodiment.

As described above, the PWM signal generation circuit 7 switches over its operation mode in accordance with the level of the selection signal Ss outputted from the switching determination circuit 9. For this reason, as shown in FIG. 2, when the output voltage Vout reaches the switching determination voltage in correspondence to the rise of the input voltage Vin, the PWM signal generation circuit 7 changes its operation mode from the normal operation mode to the short-pulse operation mode. When the output voltage Vout falls to be lower than the switching determination voltage as a result of the switching to the short-pulse operation mode, the PWM signal generation circuit 7 changes its operation mode from the short-pulse operation mode to the normal operation mode.

[2] Circuit Operation in Normal Operation Mode

As shown in FIG. 2, the PWM signal generation circuit 7 continues to be in the normal operation mode during a period, in which the detection voltage Vd is lower than the reference voltage Vr2, that is, the selection signal Ss is at the L-level. In the normal operation mode, the SR latch 22 is set at the rising time point of the dock signal CLK and the PWM signal Sp rises to the H-level.

The driver circuit 3 changes the driving signal Sg from the off-level to the on-level at the time point, which is delayed by the predetermined delay period from the rise of the PWM signal Sp. As a result, the switching element 11 turns on and the current flows to the inductor 13. The current detection signal Si is fixed to the L-level until the mask processing by the mask processing circuit 8 is finished. When the mask processing is finished, the current detection signal Si is not fixed to the L-level any more and changes to a level, which varies with the current flowing in the inductor 13.

Then, when the current detection signal Si reaches the error signal Se, the reset signal Sr1 outputted from the comparator 20 changes from the L-level to the H-level. Thus, the SR latch 22 is reset and the PWM signal Sp falls to the L-level. The driver circuit 3 changes the driving signal Sg from the on-level to the off-level at the time point delayed by the predetermined delay period from the fall of the PWM signal Sp. Thus, the switching element 11 turns off and the current flowing in the inductor 13 recirculates through the diode 12.

[3] Circuit Operation in Short-Pulse Operation Mode

As shown in FIG. 2, the PWM signal generation circuit 7 is in the short-pulse operation mode during a period, in which the detection voltage Vd is equal to or higher than the reference voltage Vr2, that is, the selection signal Ss is at the H-level. In the short-pulse operation mode, the operation at the rise time of the PWM signal Sp to the H-level is the same as that of the normal operation mode. However, the operation at the fall time of the PWM signal Sp to the L-level is different from that of the normal operation mode.

That is, in the short-pulse operation mode, the PWM signal Sp falls to the L-level in synchronization with the reset signal Sr2, which changes its level independently of the time point of reaching of the current detection signal Si to the error signal Se. Specifically, when the reset signal Sr2 changes from the L-level to the H-level, the SR latch 22 is reset and the PWM signal Sp falls to the L-level.

[4] PWM Signal Generation Sequence in Normal Operation Mode

As described above, the PWM signal generation circuit 7 in the normal operation mode operates in the similar way as a PWM signal generation circuit of a conventional switching power supply apparatus. For this reason, each circuit of the conventional apparatus is referred to as a conventional configuration. In the conventional configuration, the period of the H-level of the PWM signal Sp, that is, the ON pulse width of the PWM signal Sp, is affected largely by delay of each circuit.

Figure 3:
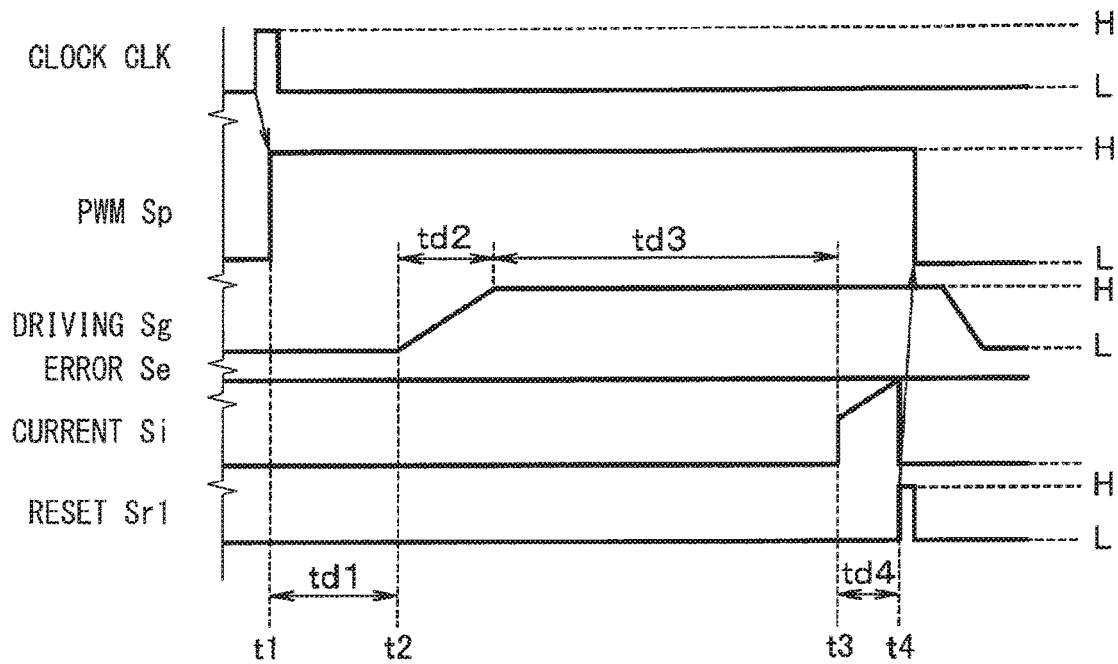
FIG. 3 is a time chart showing a PWM signal generation sequence in a normal operation mode in the first embodiment.

That is, in the normal operation shown in FIG. 3, when the PWM signal Sp changes to the H-level in synchronization with the rise of the dock signal CLK, the driving signal Sg starts to rise from time point t2, which is after a delay period td1 of the driver circuit 3 from time point t1 of the rise of the PWM signal Sp. A delay period of the SR latch 22 is far shorter than the pulse width of the PWM signal Sp and negligible.

Then, from time point t3, which is after an elapse of a time period td2 required for the driving signal Sg to rise to the H-level and an elapse of a time period td3 required for the mask processing circuit 8 to execute the mask processing, the current detection signal Si changes to the level, which corresponds to the current flowing in the inductor 13. Then at time t4, which is after an elapse of an operation period of the current detection circuit 4, that is, after an elapse of a time period td4 required for the current detection signal Si reaches the error signal Se, the reset signal Sr1 outputted from the comparator 20 changes to the H-level. The PWM signal Sp thus changes to the L-level in synchronization with the rise of the reset signal Sr1.

As described above, the reset signal Sr1 is generated via a current detection loop, which is from the dock generation circuit 19 to the comparator 20 through the driver circuit 3, the main circuit 2, the current detection circuit 4 and the mask processing circuit 8.

That is, in this case, the PWM signal Sp changes to the L-level after being delayed by the driver circuit 3, the switching element 11, the mask processing circuit 8, the current detection circuit 4 and the like from the change of the PWM signal Sp to the H-level. For this reason, in the conventional configuration, it is difficult to shorten the minimum width of the ON pulse for turning on the switching element 11 because various delay periods need be taken into consideration. For example, in case that the time period of the mask processing of the mask processing circuit 8 is set to 30 ns, the minimum width of the ON pulse of the PWM signal Sp becomes as long as 100 ns.

[5] PWM Signal Generation Sequence in Short-Pulse Operation Mode

Figure 4:
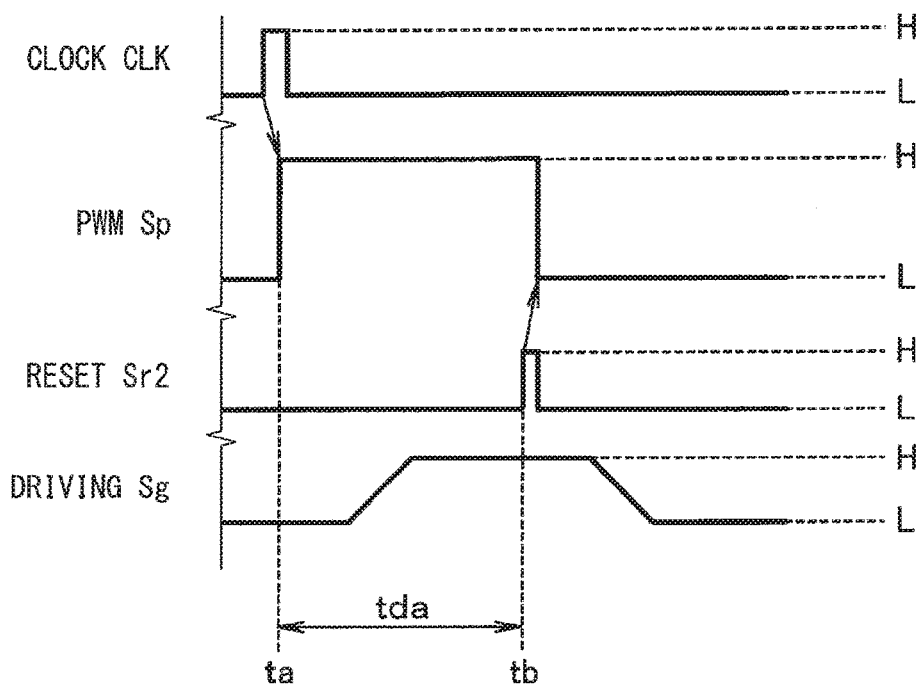
FIG. 4 is a time chart showing a PWM signal generation sequence in a short-pulse operation mode in the first embodiment.

As shown in FIG. 4, according to the PWM signal Sp generation sequence by the PWM signal generation circuit 7 in the short-pulse operation mode, it is possible to greatly shorten the minimum ON pulse width of the PWM signal Sp relative to the minimum pulse width in the conventional configuration. That is, in this case, when the PWM signal Sp changes to the H-level in synchronism with the rise of the dock signal CLK, the reset signal Sr2 outputted from the one-shot pulse generation circuit 28 changes to the H-level at time point tb, which is after an elapse of a delay period tda in the delay circuit 27 from time point ta of the rise time of the PWM signal Sp. The PWM signal Sp changes to the L-level in synchronization with the rise of the reset signal Sr2.

As described above, in the short-pulse operation mode of the PWM signal generation circuit 7, the reset signal Sr2 is generated via a wiring path of a relatively short delay period, that is, short delay loop, which is from the clock generation circuit 19 to the one-shot pulse generation circuit 28 through the delay circuit 27 and independent from the current detection loop.

That is, in this generation sequence, the PWM signal Sp changes to the L-level after the change of the PWM signal Sp to the H-level through the delay of the delay circuit 27, the delay period of which may be set arbitrarily. For this reason, according to the PWM signal generation sequence by the PWM signal generation circuit 7 in the short-pulse operation mode, it is possible to shorten the minimum ON pulse width of the PWM signal Sp greatly relative to the that in the conventional configuration.

In case that the delay period of the delay circuit 27 is set to 30 ns, for example, it is possible to maintain the minimum ON pulse width of the PWM signal Sp to be almost as short as the same delay period, that is, about 30 ns. Thus, in the short-pulse operation mode, it is possible to shorten the minimum ON pulse width of the PWM signal Sp as the delay period of the delay circuit 27 is set shorter.

However, since the PWM signal Sp is required to turn on the switching element 11 (MOSFET), it is necessary to set the minimum ON pulse width of the PWM signal Sp to be at least equal to or longer than a time period required for the driving signal Sg to rise from the L-level to the H-level. It is necessary, for this reason, to set the delay period of the delay circuit 27 to be equal to or longer than the time period required for the driving signal Sg to rise from the L-level to the H-level.

The first embodiment described above provides the following advantage.

The switching power supply apparatus 1 includes the switching determination circuit 9 and the reset signal generation circuit 10 in addition to the configuration similar to the conventional switching power supply apparatus of the current mode control type. The switching determination circuit 9 checks whether the output voltage Vout reached the switching determination voltage higher than the target output voltage. The reset signal generation circuit 10 generates the reset signal Sr2, which is delayed by the predetermined delay period from the time point of the change of the PWM signal Sp to the H-level. When the switching determination circuit 9 determines that the output voltage Vout reached the switching determination voltage, the PWM signal generation circuit 7 operates in the short-pulse operation mode, in which the PWM signal Sp is changed to the off level in synchronization with the reset signal Sr2 in place of the normal reset signal Sr1.

According to the configuration described above, the PWM signal generation circuit 7 changes its operation mode to the short-pulse operation mode from the normal operation mode when the output voltage Vout rises in response to a rise in the input voltage Vin, for example. In the short-pulse operation mode, the reset signal Sr2 is generated by a loop of a relatively short delay, which is irrespective of the current detection loop. For this reason, in the short-pulse operation mode, it is possible to set the time point when the PWM signal Sp changes to the L-level and hence the ON pulse width of the PWM signal Sp to the arbitrary value in accordance with the delay period of the reset signal generation circuit 10 without being affected so much by the operation delay of each circuit.

For this reason, since it is possible to realize the pulse width arbitrarily to attain the desired output voltage Vout, it is possible to suppress the variation in the output voltage Vout, that is, rise of the output voltage Vout. In this case, since the PWM signal Sp is generated at every switching period, that is, the PWM signal Sp is generated regularly, the switching frequency in the switching power supply apparatus 1 does not vary. According to the configuration described above, it is possible to prevent the frequency band of the radio noise from varying and the EMC property from changing.

The switching power supply apparatus 1 according to the first embodiment includes the mask processing circuit 8, which performs masking processing on the current detection signal Si. It is necessary to optimize the time point of the mask processing to prevent a surge current from causing the erroneous detection. According to the generation sequence of the PWM signal Sp in the short-pulse operation mode in the first embodiment, the reset signal Sr2 is generated irrespectively of the delay of each circuit including the mask processing circuit 8. As a result, it is possible to set the minimum ON pulse width of the PWM signal Sp to be short while optimizing the time point of mask processing.

The reset signal generation circuit 10 includes the delay circuit 27 and the one-shot pulse generation circuit 28. The delay circuit 27 outputs the delay signal by delaying the PWM signal Sp by the delay period. The one-shot pulse generation circuit 28 outputs the reset signal Sr2, which maintains the H-level for only the predetermined period from the rise of the delay signal. According to the configuration described above, it is possible to set precisely the time point of changing of the PWM signal Sp to the L-level, that is, the ON pulse width of the PWM signal Sp, to the desired value.

The switching determination circuit 9 includes the comparator 26, which compares the detection voltage Vd corresponding to the output voltage Vout outputted from the voltage detection circuit 5 and the reference voltage Vr2 corresponding to the switching determination voltage. The operation mode of the PWM signal generation circuit 7 is switched over in correspondence to the selection signal Ss outputted from the comparator 26. According to the configuration described above, the switching determination circuit 9 is enabled to check precisely and quickly whether the output voltage reached the switching determination voltage.

Second Embodiment

Figure 5:
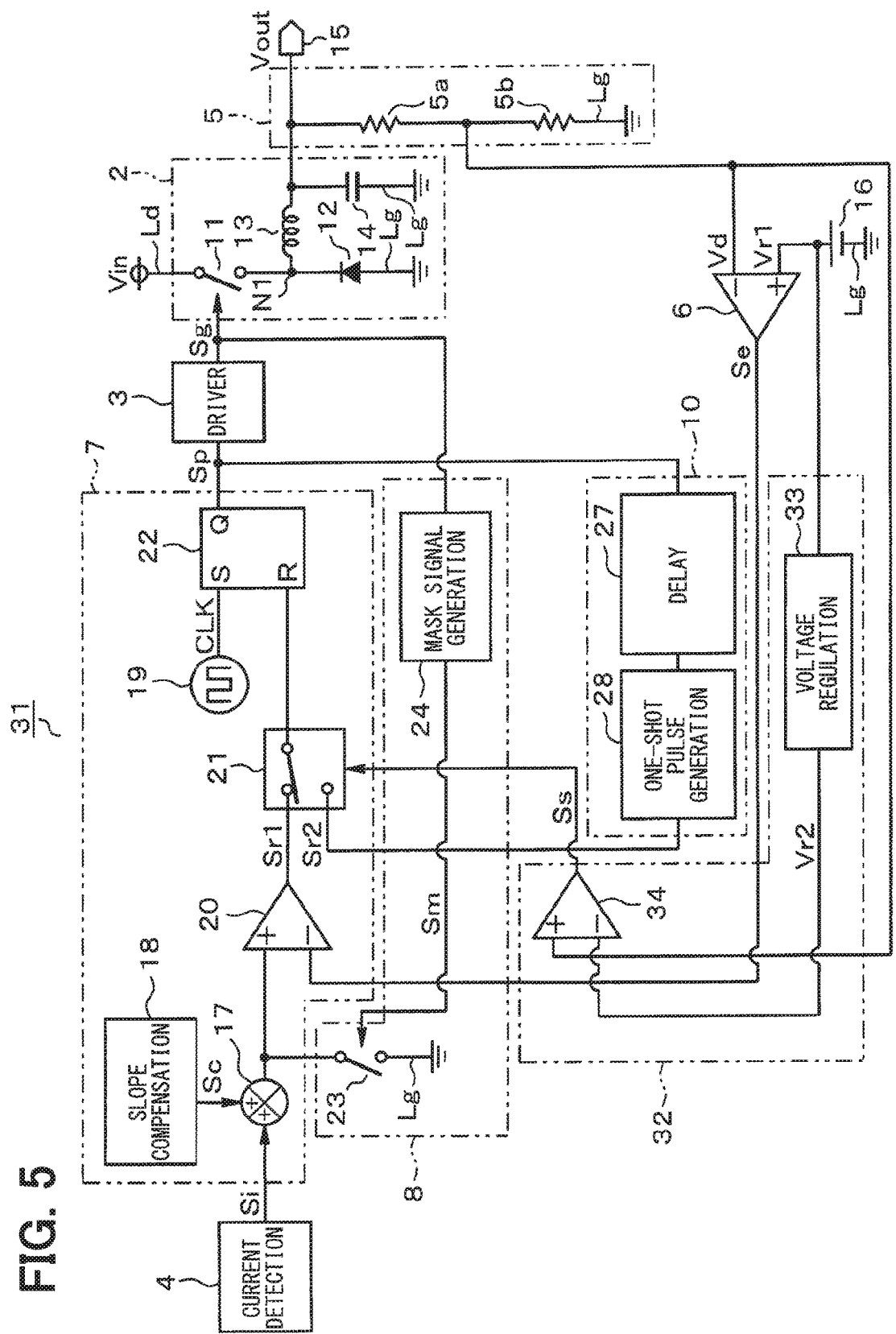
FIG. 5 is a schematic circuit diagram showing a configuration of a switching power supply apparatus according to a second embodiment.

In a second embodiment shown in FIG. 5, a switching power supply apparatus 31 is different from the switching power supply apparatus 1 according to the first embodiment in that a switching determination circuit 32 is provided in place of the switching determination circuit 9. The switching determination circuit 32 includes a voltage regulation circuit 33 and a comparator 34.

The voltage regulation circuit 33 generates a reference voltage Vr2, which corresponds to a switching determination voltage, by raising the reference voltage Vr1 generated by the reference voltage generation circuit 16 by a predetermined voltage value. The reference voltage Vr2 outputted from the voltage regulation circuit 33 is applied to an inverting input terminal of the comparator 34. Similarly to the comparator 26 in the first embodiment, the comparator 34 compares the detection voltage Vd applied to a non-inverting input terminal and the reference voltage Vr2 applied to the inverting input terminal and outputs a selection signal Ss.

As described above, since it is possible to check whether the output voltage Vout reached the switching determination voltage, the second embodiment also provides the similar advantage as the first embodiment.

Further, according to the second embodiment, the switching determination circuit 32 is configured to generate the reference voltage Vr2 by regulating the voltage value of the reference voltage Vr1 generated by the reference voltage generation circuit 16, which is necessarily provided in the switching power supply apparatus 31. According to the configuration described above, since it is not necessary to provide a dedicated power supply circuit for generating the reference voltage Vr2 corresponding to the switching determination voltage, it is possible to reduce a circuit size.

Third Embodiment

Figure 6:
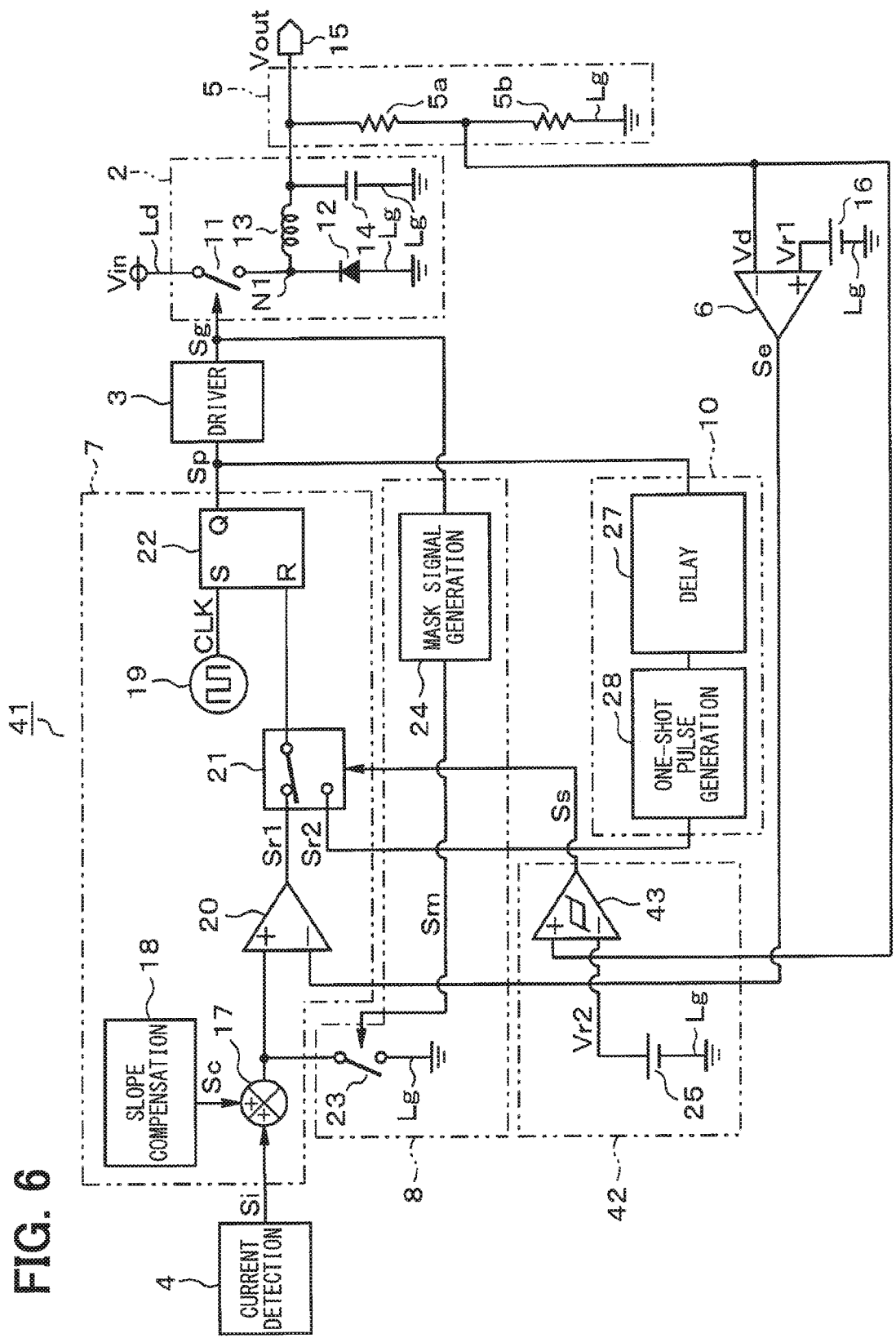
FIG. 6 is a schematic circuit diagram showing a configuration of a switching power supply apparatus according to a third embodiment.

In a third embodiment shown in FIG. 6, a switching power supply apparatus 41 is different from the switching power supply apparatus 1 according to the first embodiment in that a switching determination circuit 42 is provided in place of the switching determination circuit 9 of the first embodiment. The switching determination circuit 42 is different from the switching determination circuit 9 in that a comparator 43 having a hysteresis property is provided in place of the comparator 26.

As described above, since it is possible to check whether the output voltage Vout reached the switching determination voltage, the third embodiment also provides the similar advantage as the first embodiment. Further, since the comparator 43 of the switching determination circuit 42 has the hysteresis property, it is possible to prevent hunting, which is likely to occur when the PWM signal generation circuit 7 changes its operation mode.

Fourth Embodiment

Figure 7:
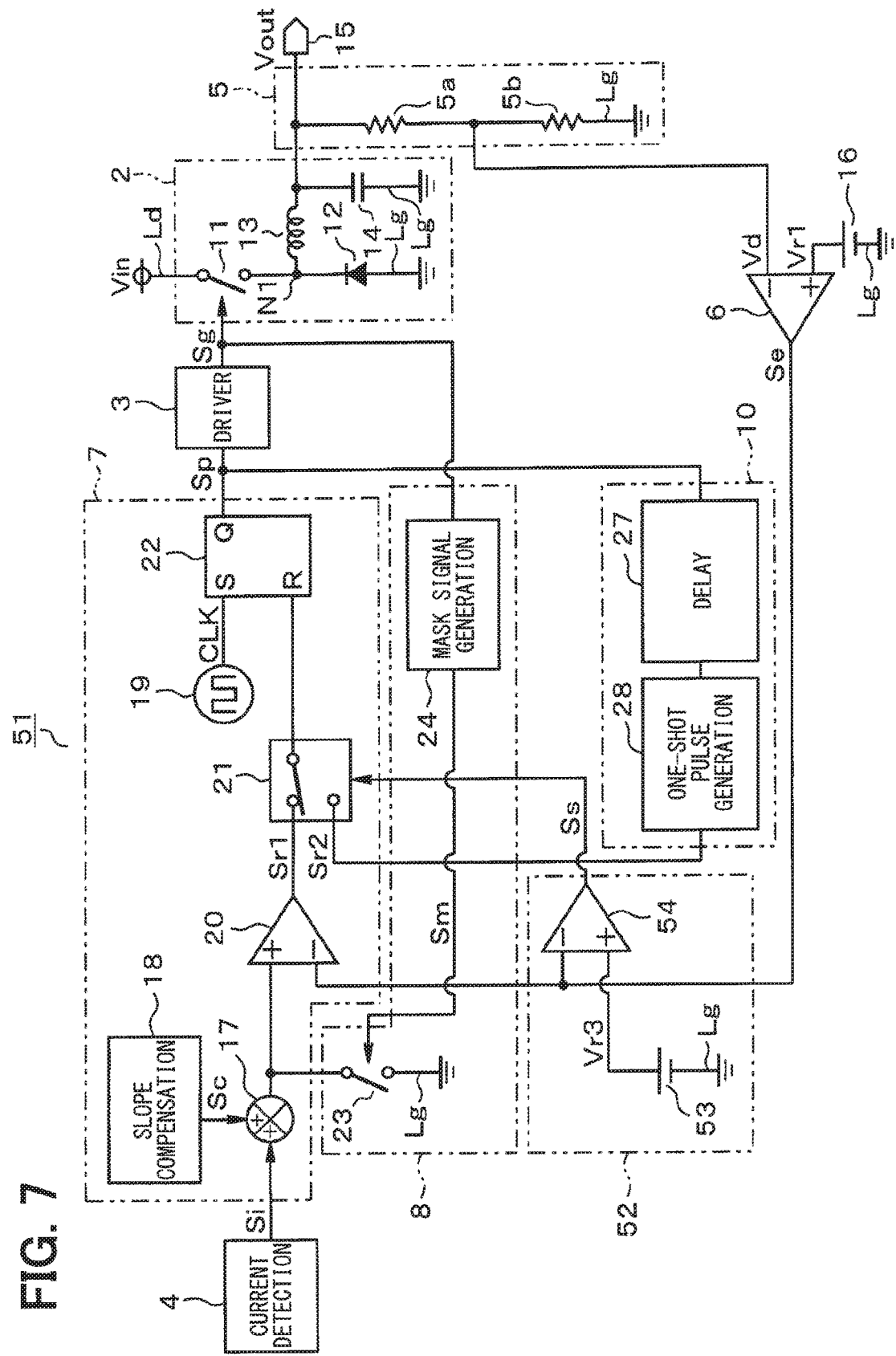
FIG. 7 is a schematic circuit diagram showing a configuration of a switching power supply apparatus according to a fourth embodiment.

In a fourth embodiment shown in FIG. 7, a switching power supply apparatus 51 is different from the switching power supply apparatus 1 according to the first embodiment in that a switching determination circuit 52 is provided in place of the switching determination circuit 9. The switching determination circuit 52 includes a reference voltage generation circuit 53 and a comparator 54.

The reference voltage detection circuit 53 generates a reference voltage Vr3, which corresponds to a switching determination voltage. The comparator 54 compares the voltage of the error signal Se applied to an inverting input terminal and the reference voltage Vr3 applied to a non-inverting input terminal and outputs a selection signal Ss. In the configuration described above, the error signal Se corresponds to the voltage detection signal corresponding to the output voltage Vout and the reference voltage Vr3 corresponds to the switching determination signal corresponding to the switching determination voltage.

The error signal Se outputted from the error amplifier 6 varies following a variation of the output voltage Vout. For this reason, even in case that the switching determination circuit 52 makes its determination based on the error signal Se, it is possible to check whether the output voltage Vout reached the switching determination voltage. As described above, the fourth embodiment also provides the similar advantage as the first embodiment.

Fifth Embodiment

Figure 8:
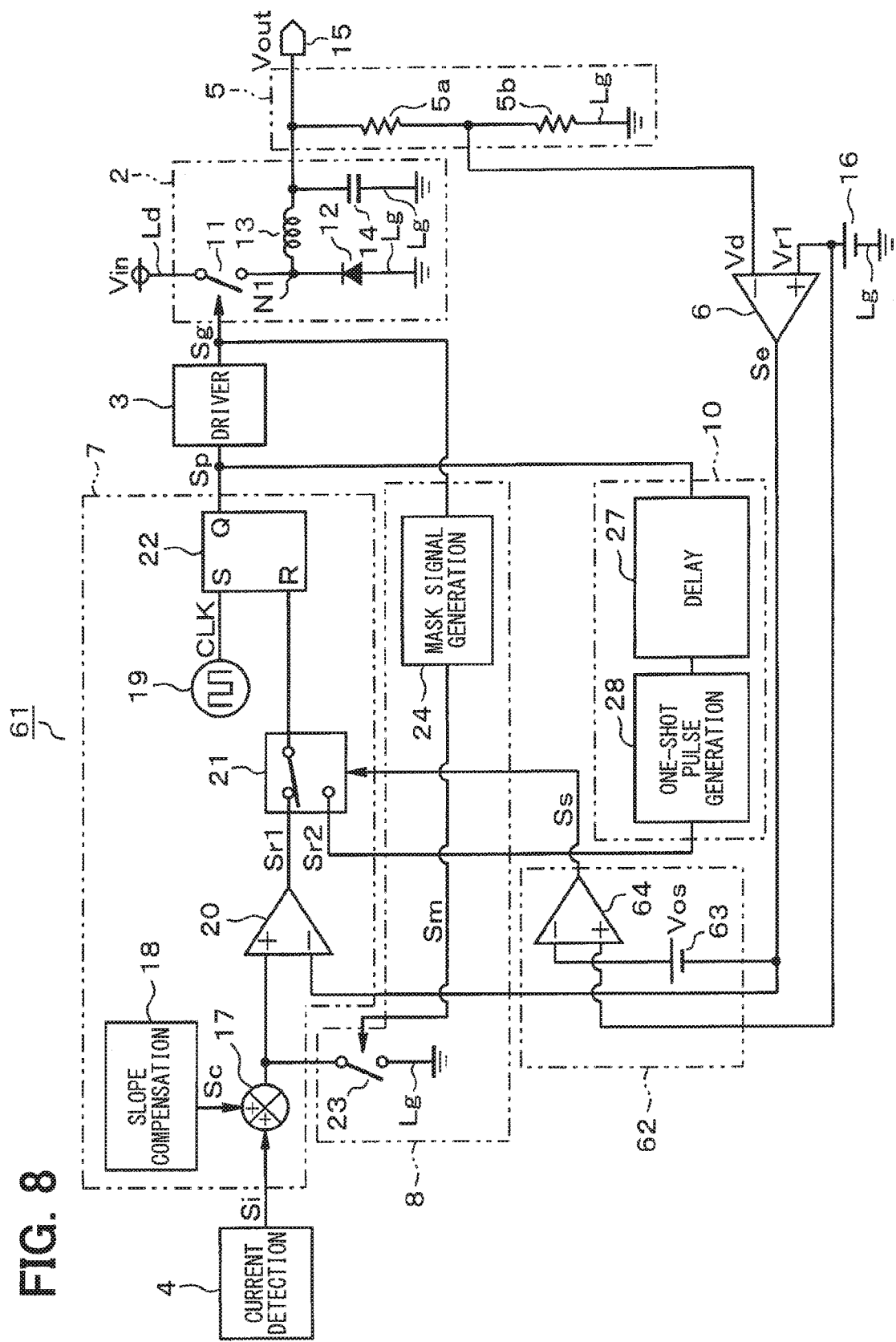
FIG. 8 is a schematic circuit diagram showing a configuration of a switching power supply apparatus according to a fifth embodiment.

In a fifth embodiment shown in FIG. 8, a switching power supply apparatus 61 is different from the switching power supply apparatus 1 according to the first embodiment in that a switching determination circuit 62 is provided in place of the switching determination circuit 9. The switching determination circuit 62 includes a voltage supply source 63 and a comparator 64.

The voltage supply source 63 supplies an offset voltage Vos. A low-potential side terminal and a high-potential side terminal of the voltage power source 63 are connected to the output terminal of the error amplifier 6 and an inverting input terminal of the comparator 64, respectively. The comparator 64 thus receives at its inverting input terminal a voltage signal, which is outputted offset by level-shifting the error signal Se by an offset voltage Vos.

The comparator 64 compares the level-shifted error signal Se applied to the inverting input terminal and the reference voltage Vr1 applied to the non-inverting input terminal and outputs a selection signal Ss. In the configuration described above, the error signal Se, which is level-shifted by the voltage power source 63 by the predetermined voltage value, corresponds to the voltage detection signal corresponding to the output voltage Vout and the reference voltage Vr1 corresponds to the switching determination signal corresponding to the switching determination voltage.

In the fourth embodiment shown in FIG. 7, the switching determination circuit 52 is configured to check whether the output voltage Vout reached the switching determination voltage by comparing the error signal Se with the reference voltage Vr3, which is different from the reference voltage Vr1 used in the error amplifier 6. However, as exemplified in the fifth embodiment shown in FIG. 8, even in case that the switching determination circuit 52 is configured to compare the signal, which is outputted by level-shifting the error signal Se, with the reference voltage Vr1 used in the error amplifier 6, it is possible to check whether the output voltage Vout reached the switching determination voltage. As described above, the fifth embodiment also provides the similar advantage as the first embodiment.

Sixth Embodiment

Figure 9:
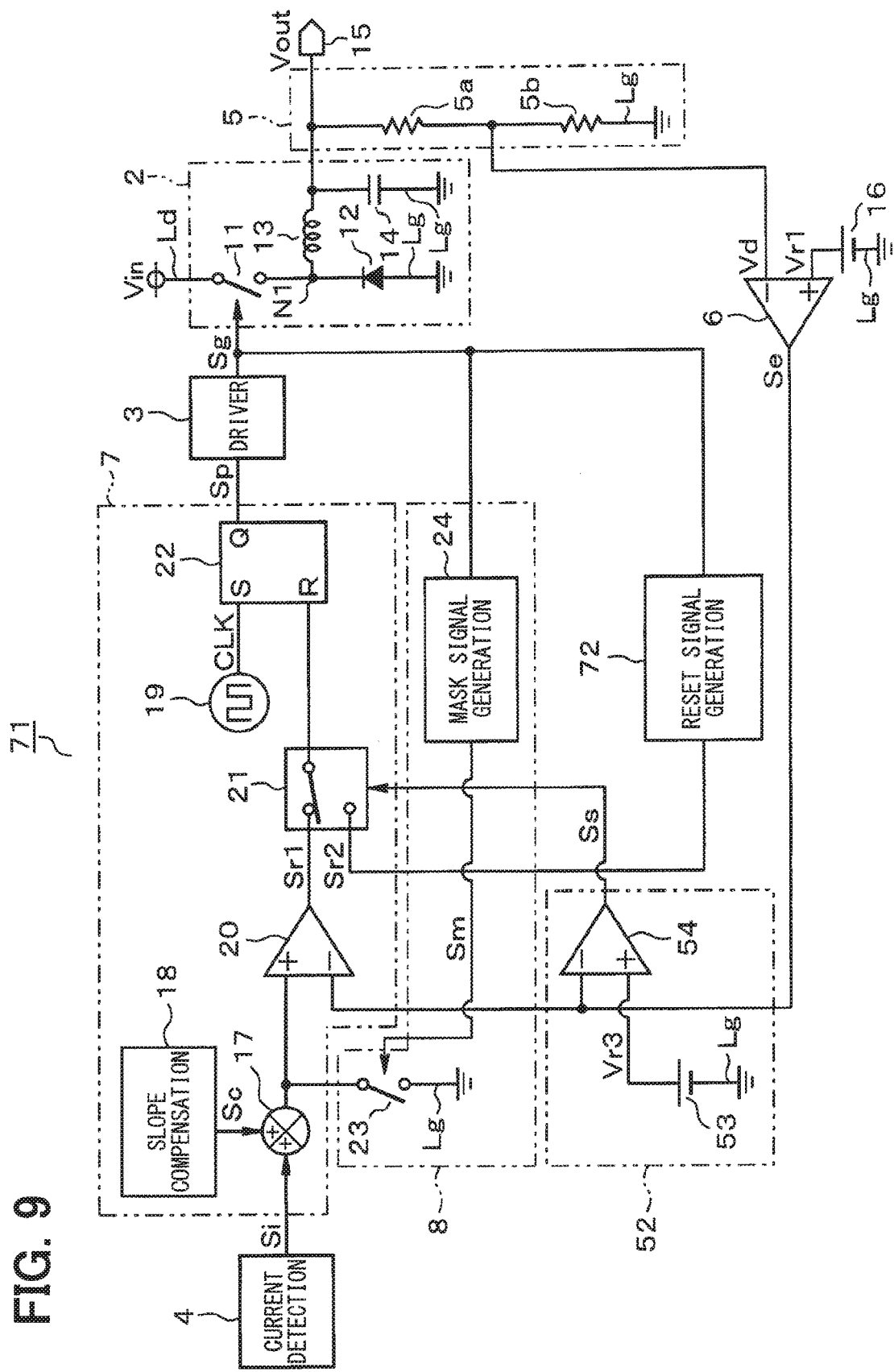
FIG. 9 is a schematic circuit diagram showing a configuration of a switching power supply apparatus according to a sixth embodiment.

In a sixth embodiment shown in FIG. 9, a switching power supply apparatus 71 is different from the switching power supply apparatus 51 according to the fourth embodiment in that a reset signal generation circuit 72 is provided in place of the reset signal generation circuit 10.

In this configuration, the reset signal generation circuit 72 is formed of a one-shot pulse generation circuit for generating a reset signal Sr2 by using the driving signal Sg outputted from the driver circuit 3. Specifically, the reset signal generation circuit 72 generates the reset signal Sr2 as a pulse signal, which maintains an H-level for only a predetermined period from when the driving signal Sg reached a predetermined value (for example, on-level).

According to the configuration described above, since it is possible to generate the reset signal Sr2, which is delayed for a predetermined period from the time point of a change of the PWM signal Sp to the on-level, the sixth embodiment also provides the similar advantage as the first embodiment.

However, in the configuration described above, the ON pulse width of the PWM signal Sp in the short-pulse operation mode includes the delay period of the driver circuit 3. Accordingly, the configuration of the sixth embodiment is more limited than in the configuration of the first embodiment with respect to setting of the minimum ON pulse width. In the sixth embodiment, however, the reset signal generation circuit 72 does not need a delay circuit and hence it is possible to reduce a circuit size relative to the configuration of the first embodiment.

Seventh Embodiment

Figure 10:
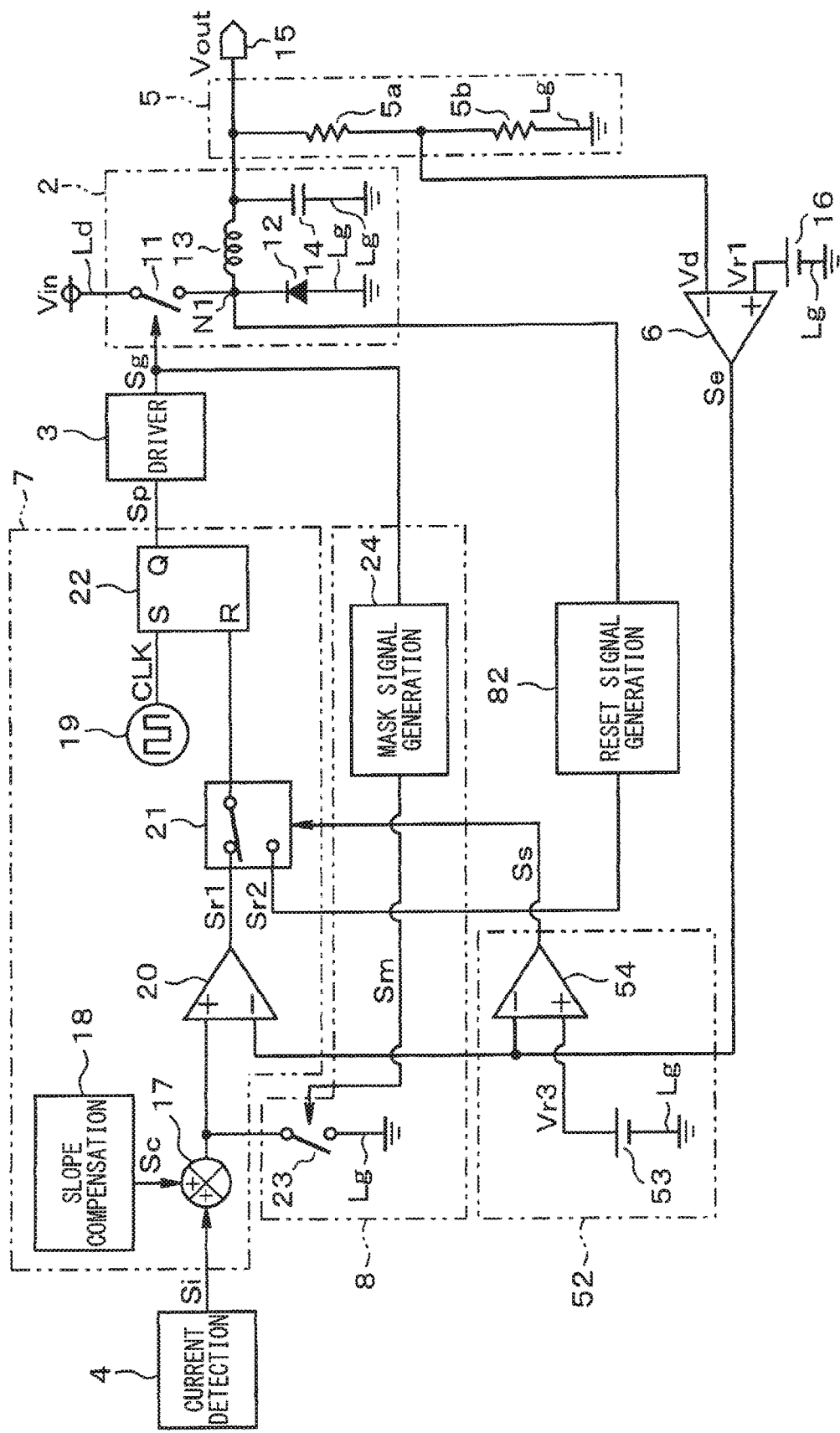
FIG. 10 is a schematic circuit diagram showing a configuration of a switching power supply apparatus according to a seventh embodiment.

In a seventh embodiment shown in FIG. 10, a switching power supply apparatus 81 is different from the switching power supply apparatus 51 according to the fourth embodiment in that a reset signal generation circuit 82 is provided in place of the reset signal generation circuit 10.

In this configuration, the reset signal generation circuit 82 is formed of a one-shot pulse generation circuit for generating a reset signal Sr2 by using a terminal voltage of the node N1, that is, of the switching element 11.

Specifically, the reset signal generation circuit 82 generates the reset signal Sr2 as a pulse signal, which maintains an H-level for only a predetermined period from when the voltage at the node N1 reached a predetermined value (for example, about input voltage Vin).

According to the configuration described above, since it is possible to generate the reset signal Sr2, which is delayed for a predetermined period from the time point of a change of the PWM signal Sp to the on-level, the seventh embodiment also provides the similar advantage as the first embodiment.

However, in the configuration described above, the ON pulse width of the PWM signal Sp in the short-pulse operation mode includes the delay period of the switching element 11. Accordingly, the configuration of the seventh embodiment is more limited than in the configuration of the first embodiment with respect to setting of the minimum ON pulse width. In the seventh embodiment, however, the reset signal generation circuit 82 does not need a delay circuit and hence it is possible to reduce a circuit size relative to the configuration of the first embodiment.

Eighth Embodiment

Figure 11:
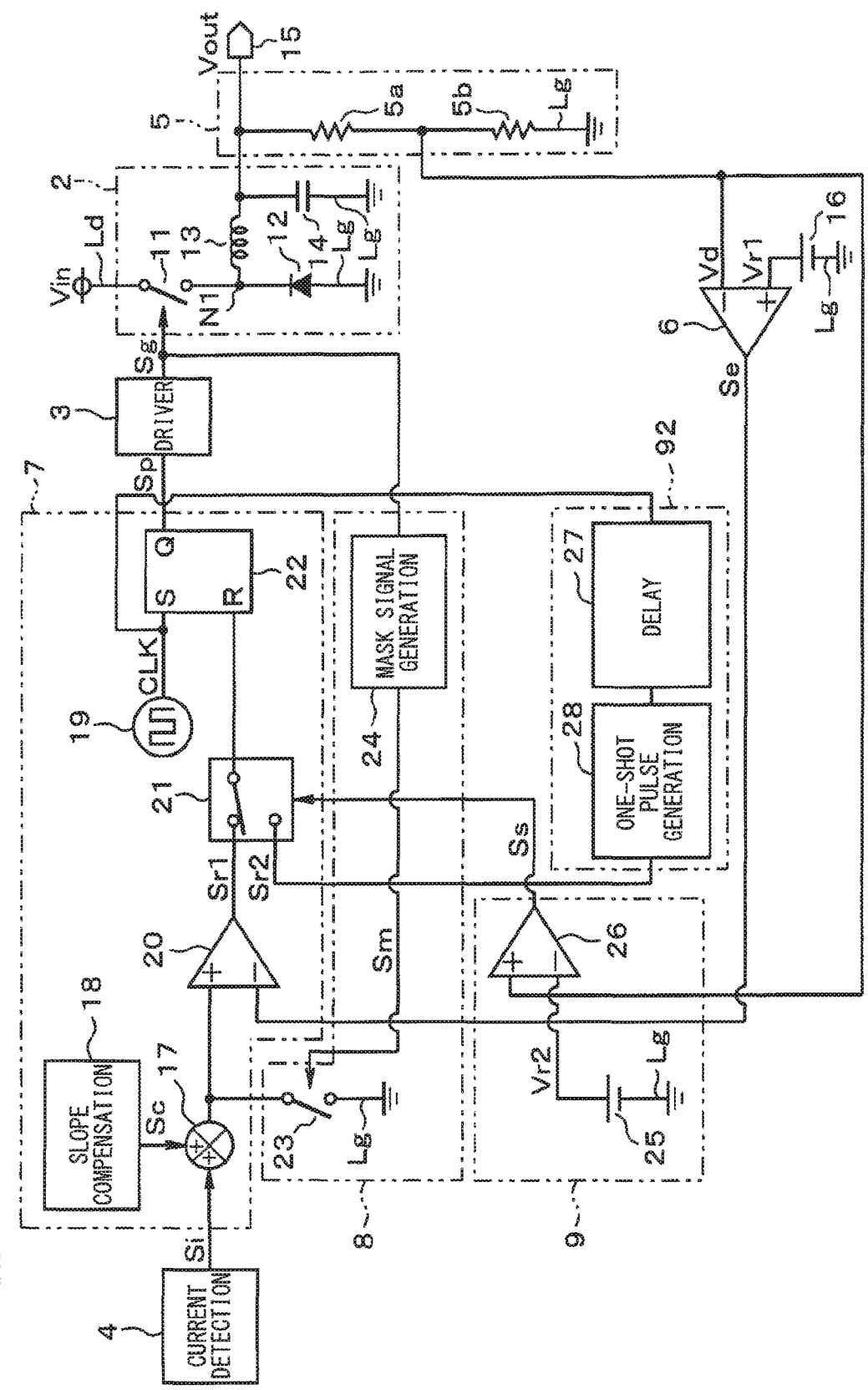
FIG. 11 is a schematic circuit diagram showing a configuration of a switching power supply apparatus according to an eighth embodiment.

In an eighth embodiment shown in FIG. 11, a switching power supply apparatus 91 is different from the switching power supply apparatus 1 according to the first embodiment in that a reset signal generation circuit 92 is provided in place of the reset signal generation circuit 10.

In this configuration, the reset signal generation circuit 92 includes the delay circuit 27 and the one-shot pulse generation circuit 28 similarly to the reset signal generation circuit 10 of the first embodiment. The reset signal generation circuit 92 generates the reset signal Sr2 by using the dock signal CLK, which is outputted from the dock generation circuit 19.

In this configuration, the delay circuit 27 receives the clock signal CLK and outputs the delay signal by delaying the dock signal by the predetermined delay period. The one-shot pulse generation circuit 28 generates the reset signal Sr2 as a pulse signal, which is maintained at the H-level for only the predetermined period from the rise of the delay signal applied from the delay circuit 27.

According to the configuration described above, since it is possible to generate the reset signal Sr2, which is delayed for the predetermined delay period from the time point of a change of the PWM signal Sp to the on-level, the eighth embodiment also provides the similar advantage as the first embodiment.

Ninth Embodiment

Figure 12:
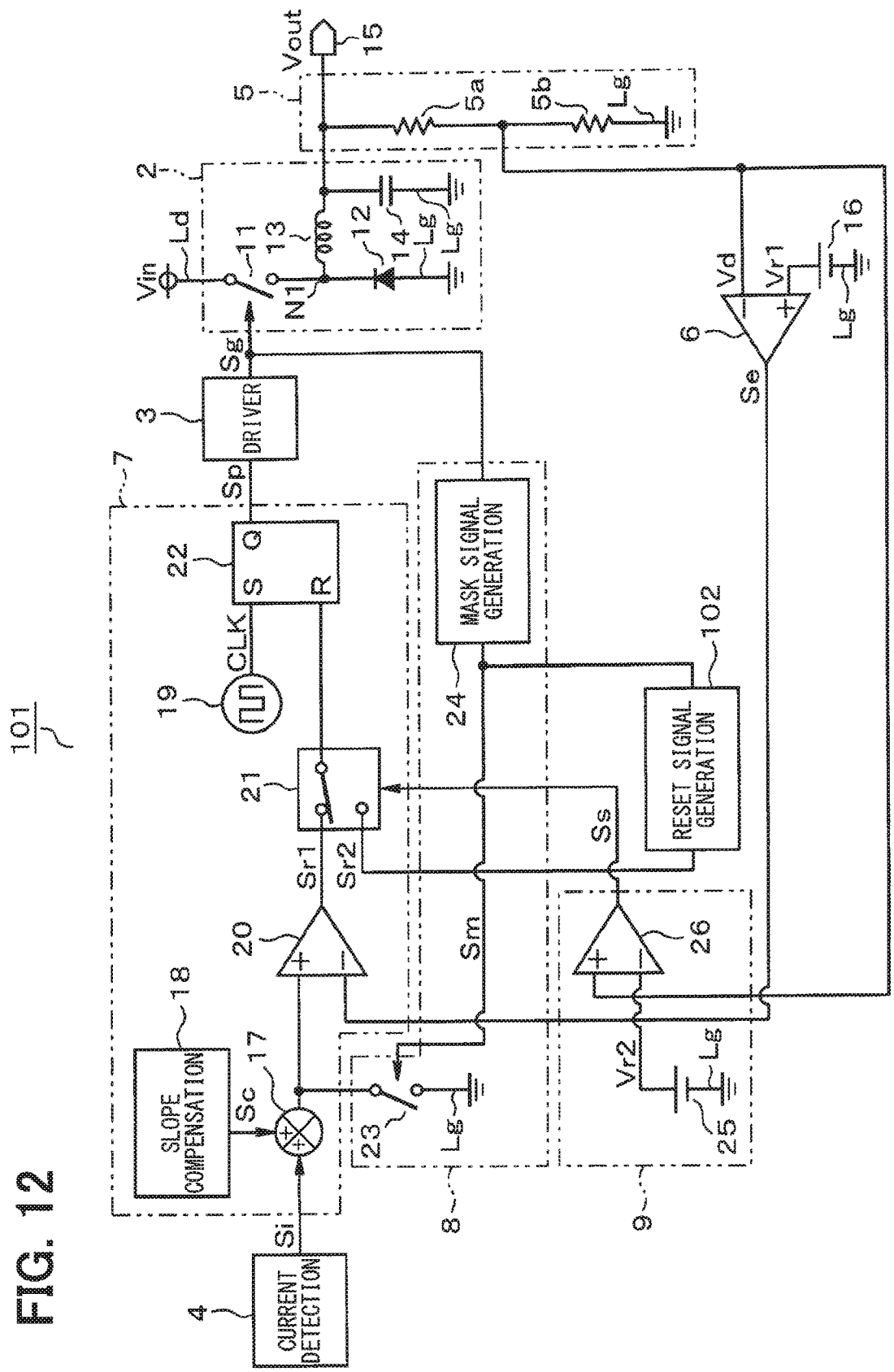
FIG. 12 is a schematic circuit diagram showing a configuration of a switching power supply apparatus according to a ninth embodiment.

In a ninth embodiment shown in FIG. 12, a switching power supply apparatus 101 is different from the switching power supply apparatus 1 according to the first embodiment in that a reset signal generation circuit 102 is provided in place of the reset signal generation circuit 10.

In this configuration, the reset signal generation circuit 102 is formed of a one-shot pulse generation circuit for generating a reset signal Sr2 by using the mask signal Sm outputted from the mask signal generation circuit 24. The reset signal generation circuit 92 generates the reset signal. Specifically, the reset signal generation circuit 102 outputs the reset signal Sr2 as a pulse signal, which maintains a H-level for only a predetermined period from the rise of the mask signal Sm.

According to the configuration described above, since it is possible to generate the reset signal Sr2, which is delayed for the predetermined delay period from the time point of a change of the PWM signal Sp to the on-level, the ninth embodiment also provides the similar advantage as the first embodiment.

However, in the configuration described above, the ON pulse width of the PWM signal Sp in the short-pulse operation mode is determined based on the delay period of the mask signal generation circuit 24. Accordingly, the configuration of the ninth embodiment is more limited than in the configuration of the first embodiment with respect to setting of the minimum ON pulse width. In the ninth embodiment, however, the reset signal generation circuit 102 uses the delay of the mask signal generation circuit 24 in common and hence does not need a dedicated delay circuit. As a result, it is possible to reduce a circuit size relative to the configuration of the first embodiment because of no necessity of the dedicated delay circuit.

Tenth Embodiment

In each of the embodiments described above, the PWM signal Sp in the short-pulse operation mode is exemplified to have only one ON pulse width. However, the ON pulse width of the PWM signal Sp may be switched over among multiples pulse widths stepwisely. One example of this modification will be described as a tenth embodiment with reference to FIG. 13.

Figure 13:
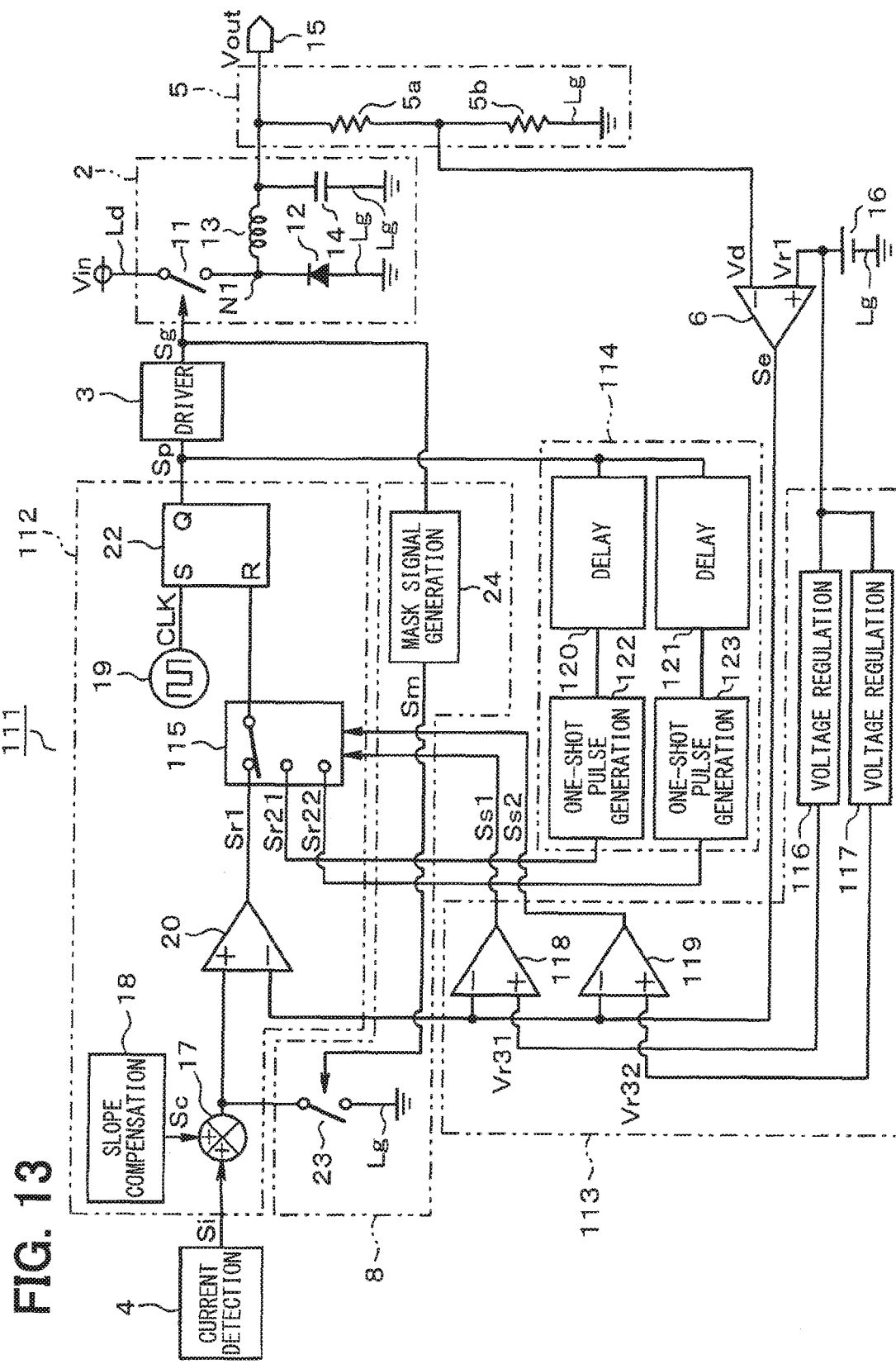
FIG. 13 is a schematic circuit diagram showing a configuration of a switching power supply apparatus according to a tenth embodiment.

As shown in FIG. 13, a switching power supply apparatus 111 according to the tenth embodiment is different from the switching power supply apparatus 51 of the fourth embodiment in that a PWM signal generation circuit 112, a switching determination circuit 113 and a reset signal generation circuit 114 are provided in place of the PWM signal generation circuit 7, the switching determination circuit 52 and the reset signal generation circuit 10, respectively.

The PWM signal generation circuit 112 is different from the PWM signal generation circuit 7 in that a switching circuit 115 is provided in place of the main circuit 21. Three input terminals of the switching circuit 115 receive the reset signal Sr1 and reset signals Sr21 and Sr22, which are outputted from the reset signal generation circuit 114. The switching circuit 115 selects and outputs either one of the reset signals Sr1, Sr21 and Sr22 based on selection signals Ss1 and Ss2 outputted from the switching determination circuit 113. The output signal of the switching circuit 115 is applied to the reset terminal R of the SR latch 22.

The switching determination circuit 113 includes voltage regulation circuits 116 and 117 and comparators 118 and 119 thereby to check whether the output voltage Vout reached a first switching determination voltage and a second switching determination voltage, respectively. The first switching determination voltage and the second switching determination voltage are predetermined to be higher than the target voltage value of the output voltage Vout. The second switching determination voltage is set to be higher than the first switching determination voltage.

The voltage regulation circuit 116 generates a reference voltage Vr31, which corresponds to the first switching determination voltage, by raising the reference voltage by a predetermined voltage value. The reference voltage Vr31 outputted from the voltage regulation circuit 116 is applied to a non-inverting input terminal of the comparator 118. The comparator 118 outputs the selection signal Ss1 by comparing the error signal Se applied to an inverting input terminal with the reference voltage Vr31 applied to a non-inverting input terminal.

The voltage regulation circuit 117 generates the reference voltage Vr32 corresponding to the second switching determination voltage by raising the reference voltage Vr1 by a predetermined voltage value. The reference voltage Vr32 outputted from the voltage regulation circuit 117 is applied to a non-inverting input terminal of the comparator 119. The comparator 119 outputs a selection signal Ss2 by comparing the error signal Se applied to the inverting input terminal with the reference voltage Vr32 applied to the non-inverting input terminal.

The reset signal generation circuit 114 generates a first reset signal Sr21 and a second reset signal Sr22, which are delayed from a time point of a change of the PWM signal Sp by a first delay period and a second delay period, respectively. The reset signals Sr21 and Sr22 correspond to reset signals for short-pulse operations. The second delay period is set to be shorter than the first delay period. The reset signal generation circuit 114 includes delay circuits 120 and 121 and one-shot pulse generation circuits 122 and 123.

The delay circuit 120 receives the PWM signal Sp and outputs a delay signal by delaying the PWM signal Sp by the first delay period. The one-shot pulse generation circuit 122 outputs the reset signal Sr21 as a pulse signal, which is maintained at an H-level for only a predetermined period from a rise of the delay signal applied from the delay circuit 120.

The delay circuit 121 receives the PWM signal Sp and outputs a delay signal by delaying the PWM signal Sp by the second delay period. The one-shot pulse generation circuit 123 outputs the reset signal Sr22 as a pulse signal, which is maintained at an H-level for only a predetermined period from a rise of the delay signal applied from the delay circuit 121.

In the configuration described above, the PWM signal generation circuit 112 operates in the normal operation mode as long as the output voltage Vout is lower than the first switching determination voltage. Further, the PWM signal generation circuit 112 operates in the short-pulse operation mode for resetting the SR latch 22 by using the reset signal Sr21 as long as the output voltage Vout is equal to or higher than the first switching determination voltage and lower than the second switching determination voltage. Still further, the PWM signal generation circuit 112 operates in the short-pulse operation mode for resetting the SR latch 22 by using the reset signal Sr22 as long as the output voltage Vout is equal to or higher than the second switching determination voltage.

According to the configuration described above, the tenth embodiment also provides the similar advantage as the first embodiment. Further, according to the tenth embodiment, the ON pulse width is switched over among multiple pulse widths in steps in the short-pulse operation mode. It is thus possible to reduce ripple components of the output voltage Vout in the short-pulse operation mode.

Eleventh Embodiment

Each of the switching power supply apparatuses described above is implemented in a step-down type regulator but may be implemented in a step-up regulator. An eleventh embodiment will be described as a step-up regulator shown in FIG. 14.

Figure 14:
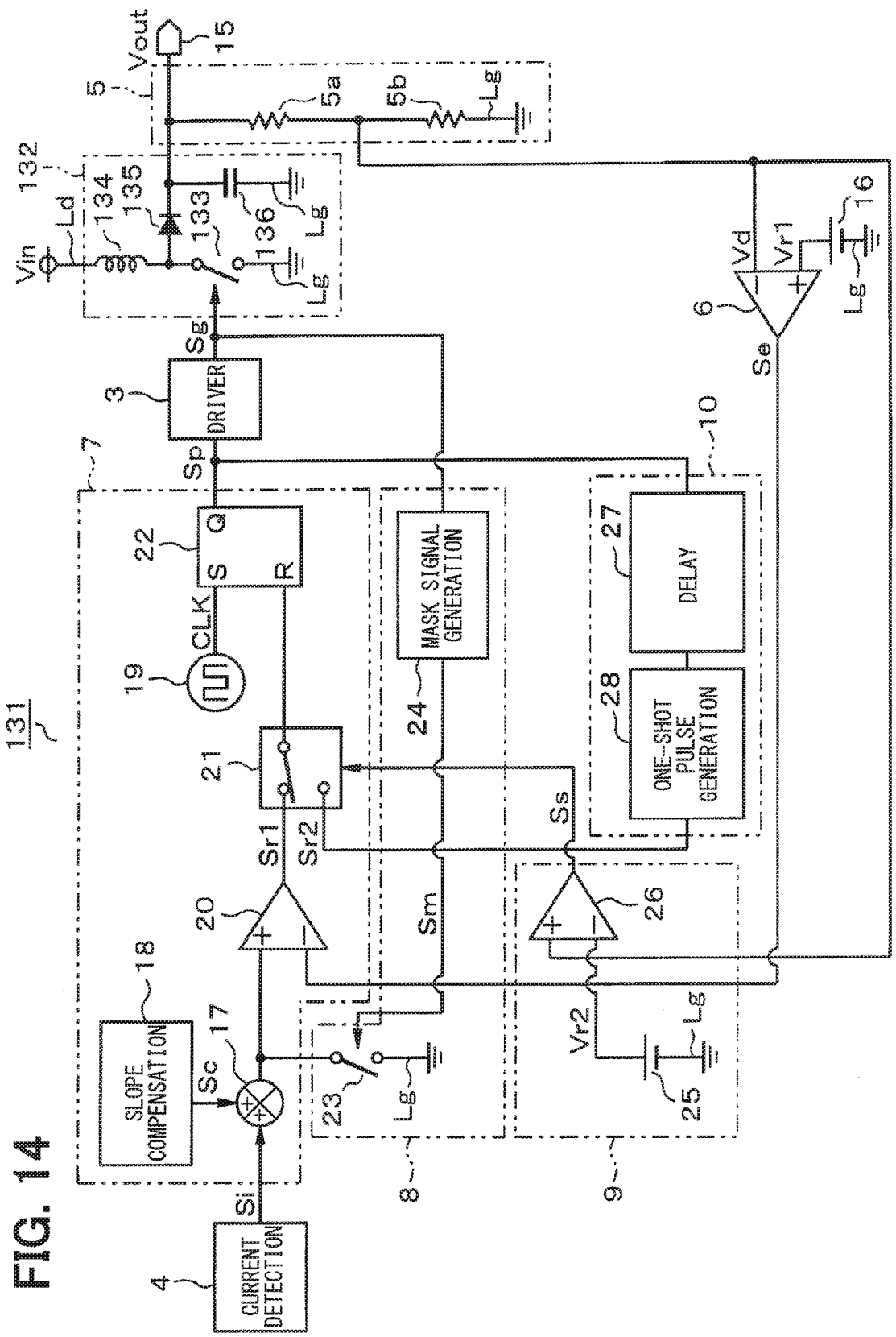
FIG. 14 is a schematic circuit diagram showing the configuration of a switching power supply apparatus according to an eleventh embodiment.

As shown in FIG. 14, a switching power supply apparatus 131 is configured similarly to the switching power supply apparatus 1 according to the first embodiment except that it is a step-up type. Same structural parts of the switching power supply apparatus 131 as those of the switching power supply apparatus 1 are designated with the same reference numerals to simplify the description.

A main circuit 132 of the switching power supply apparatus 131 includes a switching element 133, an inductor 134, a diode 135 and a capacitor 136. The switching element 133 is formed of, for example, a MOSFET and illustrated as a simple switch. One main terminal and the other main terminal of the switching element 133 are connected to the power line Ld, which supplies the input voltage Vin through the inductor 134, and to the ground line Lg, which supplies the circuit reference potential, respectively. The switching element 133 turns on when the driving signal Sg of the on-level exceeding a threshold voltage Vth is applied from the driver circuit 3.

An anode and a cathode of the diode 135 are connected to a mutual connection point between the switching element 133 and the inductor 134 and to the output terminal 15, which outputs the output voltage Vout, respectively.

The capacitor 136 is a smoothing capacitor connected between the output terminal 15 and the ground line Lg.

According to the step-up type regulator according to the eleventh embodiment described above, the PWM signal generation circuit 7 changes its operation mode to the short-pulse operation mode when the voltage reaches the switching determination voltage. The pulse width of the PWM signal Sp in the short-pulse operation mode may be set to an arbitrary value by the delay period of the delay circuit 27. Since it is possible according to the eleventh embodiment as well to realize an arbitrary pulse width required to attain a desired output voltage Vout, the eleventh embodiment also provides the similar advantage that the variation of the output voltage Vout is suppressed without changing the switching frequency as in the first embodiment.

Other Embodiment

The switching power supply apparatus described above is not limited to the embodiments described above and shown in the drawings but may be modified or combined in various ways. For example, it is not limited to a switching power supply apparatus of a non-insulated type but may be a switching power supply apparatus of an insulated type. A rectification type is not limited to a diode rectification type but may be a synchronous rectification type.

The current detection circuit for detecting the current flowing in the inductor is not limited to the high-potential side current detection type but may be a low-potential side current detection type. In the low-potential side current detection type, an OFF pulse width of the PWM signal, that is, a period of L-level of the PWM signal, is limited by a delay of each circuit. However, the OFF pulse period may be lengthened in the similar way as in the foregoing embodiments. The mask processing circuit 8 may be provided only when necessary.

What is claimed is:

1. A switching power supply apparatus comprising:
   a main circuit including a switching element and an inductor, the switching element turning on to increase a current flowing in the inductor when a driving signal changes to an on-level and turning off to recirculate the current flowing in the inductor to an output side when the driving signal changes to an off-level;
   a current detection circuit for outputting a current detection signal corresponding to the current flowing in the inductor through the switching element;
   a voltage detection circuit for outputting a detection voltage corresponding to an output voltage of the main circuit;
   an error amplification circuit for outputting an error signal in accordance with a difference between a reference voltage corresponding to a target output voltage of the main circuit and the detection voltage;
   a PWM signal generation circuit for performing a current mode control to set a PWM signal to the on-level in synchronization with a clock signal and set the PWM signal to the off-level in synchronization with a normal reset signal, which changes a level when the current detection signal reaches the error signal;
   a driver circuit for outputting the driving signal in response to the PWM signal;
   a switching determination circuit for checking whether the output voltage reached a switching determination voltage higher than the target output voltage; and
   a reset signal generation circuit for generating a reset signal for a short-pulse operation, which is delayed by a predetermined delay period from a time point of a change of the PWM signal to the on-level,
   wherein the PWM signal generation circuit changes the PWM signal to the off-level in synchronization with the reset signal for short-pulse operation in place of the normal reset signal when the switching determination circuit determines that the output voltage reached the switching determination voltage.

2. The switching power supply apparatus according to claim 1, further comprising:
   a mask processing circuit for performing mask processing on the current detection signal,
   wherein the PWM signal generation circuit changes the PWM signal to the off-level in synchronization with the normal reset signal, which changes a level when the current detection signal after mask processing reached the error signal.

3. The switching power supply apparatus according to claim 1, wherein:
   the switching determination circuit includes a comparator for comparing the detection voltage corresponding to the output voltage and a switching determination signal corresponding to the switching determination voltage; and the switching determination circuit performs a checking operation based on an output signal of the comparator.

4. The switching power supply apparatus according to claim 3, wherein:
the comparator has a hysteresis property.

5. The switching power supply apparatus according to claim 3, wherein:
the detection voltage corresponds to the detection voltage outputted from the voltage detection circuit.

6. The switching power supply apparatus according to claim 3, wherein:
the detection voltage corresponds to the error signal outputted from the error amplification circuit.

7. The switching power supply apparatus according to claim 3, wherein:
the detection voltage corresponds to a signal, which is outputted by level-shifting the error signal outputted from the error amplification circuit by a predetermined value.

8. The switching power supply apparatus according to claim 1, wherein:
the PWM signal generation circuit is reset by the clock signal and includes an SR latch, which is reset by the normal reset signal or the reset signal for short-pulse operation; and
the reset signal generation circuit generates the reset signal for short-pulse operation by using an output signal of the SR latch.

9. The switching power supply apparatus according to claim 1, wherein:
the reset signal generation circuit generates the reset signal for short-pulse operation by using the driving signal.

10. The switching power supply apparatus according to claim 1, wherein:
the reset signal generation circuit generates the reset signal for short-pulse operation by using a terminal voltage of the switching element.

11. The switching power supply apparatus according to claim 2, wherein:
the reset signal generation circuit generates the reset signal for short-pulse operation by using an output signal of the mask processing circuit.

12. The switching power supply apparatus according to claim 1, wherein:
the switching determination circuit checks whether the output voltage reached each of multiple switching determination voltages having different values;
the reset signal generation circuit generates multiple reset signals for short-pulse operation having different delay periods; and
the PWM signal generation circuit changes the PWM signal to the off-level in synchronization with a particular reset signal for short-pulse operation in place of the normal reset signal when the switching determination circuit determines that the output voltage reached particular one of the multiple switching determination voltages, the particular reset signal for short-pulse operation having the delay period corresponding to the particular one of the switching determination voltages.

* * * * *